United States Patent
Hollmach et al.

(10) Patent No.: US 9,476,741 B2
(45) Date of Patent: Oct. 25, 2016

(54) METHOD FOR DENSITY CORRECTION IN A VORTEX, FLOW MEASURING DEVICE

(75) Inventors: Marc Hollmach, Basel (CH); Sascha Kamber, Aesch (CH)

(73) Assignee: Endress + Hauser Flowtec AG, Reinach (CH)

( * ) Notice: Subject to any disclaimer, the term of this patent is extended or adjusted under 35 U.S.C. 154(b) by 627 days.

(21) Appl. No.: 13/976,533

(22) PCT Filed: Nov. 23, 2011

(86) PCT No.: PCT/EP2011/070864
§ 371 (c)(1),
(2), (4) Date: Jun. 27, 2013

(87) PCT Pub. No.: WO2012/089430
PCT Pub. Date: Jul. 5, 2012

(65) Prior Publication Data
US 2013/0282309 A1    Oct. 24, 2013

(30) Foreign Application Priority Data
Dec. 28, 2010  (DE) .................. 10 2010 064 278

(51) Int. Cl.
*G01F 1/00*   (2006.01)
*G01F 1/32*   (2006.01)
(Continued)

(52) U.S. Cl.
CPC .............. *G01F 1/3209* (2013.01); *G01F 1/74* (2013.01); *G01F 1/86* (2013.01); *G01F 15/024* (2013.01); *G01F 25/0007* (2013.01)

(58) Field of Classification Search
CPC ................................. G01F 1/86; G01K 17/12
See application file for complete search history.

(56) References Cited

U.S. PATENT DOCUMENTS

| 4,574,643 A | 3/1986 | Scott et al. |
| 4,984,456 A | 1/1991 | Takahashi |

(Continued)

FOREIGN PATENT DOCUMENTS

| CN | 1015643568 A | 10/2009 |
| CN | 101730834 A | 6/2010 |

(Continued)

OTHER PUBLICATIONS

German Search Report dated Sep. 29, 2011, issued in Application No. 10 2010 064 278.9, in Munich, German.

(Continued)

*Primary Examiner* — Elias Desta
(74) *Attorney, Agent, or Firm* — Bacon & Thomas, PLLC (57) ABSTRACT

A method for determining mass flow of a two-phase medium flowing through a measuring tube of a vortex, flow measuring device. The measuring tube has in a measuring cross section at least one bluff body for producing vortices. By sensor registering of the produced vortices, a flow velocity of the medium in the region of the measuring cross section is determined. In the method, the density of the medium in the region of the measuring cross section is determined from the specific, total enthalpy of the medium in the region of the measuring cross section, from the flow velocity of the medium in the region of the measuring cross section, from a static pressure of the medium in the region of the measuring cross section and from the static temperature of the medium in the region of the measuring cross section. Additionally, the mass flow is determined from the determined flow velocity, the determined density and a flow cross section of the medium in the region of the measuring cross section.

14 Claims, 1 Drawing Sheet

(51) Int. Cl.
*G01F 25/00* (2006.01)
*G01F 1/74* (2006.01)
*G01F 1/86* (2006.01)
*G01F 15/02* (2006.01)

(56) References Cited

U.S. PATENT DOCUMENTS

| | | | |
|---|---|---|---|
| 5,447,073 | A | 9/1995 | Kalinoski |
| 6,170,338 | B1 | 1/2001 | Kleven et al. |
| 8,447,536 | B2 * | 5/2013 | Hocker ............... G01F 1/36 702/104 |
| 2004/0049358 | A1 | 3/2004 | Cook |
| 2004/0219079 | A1 * | 11/2004 | Hagen ................ F01K 21/047 422/607 |
| 2006/0260384 | A1 | 11/2006 | Gysling et al. |
| 2008/0141769 | A1 | 6/2008 | Schmidt et al. |

FOREIGN PATENT DOCUMENTS

| | | |
|---|---|---|
| DE | 10 2007 030 690 A1 | 5/2009 |
| EP | 0 666 468 A2 | 8/1995 |
| WO | 03062759 A1 | 7/2003 |
| WO | 2004/023081 A2 | 3/2004 |
| WO | 2009/003966 A1 | 1/2009 |

OTHER PUBLICATIONS

International Preliminary Report on Patentability dated Mar. 2, 2012, issued in Application No. PCT/EP2011/070864, in Rijswijk, the Nethelands.

International Preliminary Report on Patentability dated Jul. 11, 2013, issued in Application No. PCT/EP2011/070864, in Geneva, Switzerland.

* cited by examiner

METHOD FOR DENSITY CORRECTION IN A VORTEX, FLOW MEASURING DEVICE

TECHNICAL FIELD

The present invention relates to a method for determining mass flow of an, at least at times, at least two-phase medium flowing through a measuring tube of a vortex, flow measuring device, wherein the measuring tube has in a measuring cross section at least one bluff body for producing vortices and wherein, by sensor registering of the produced vortices, a flow velocity of the medium in the region of the measuring cross section is determined. The present invention relates also to a correspondingly embodied vortex, flow measuring device.

BACKGROUND DISCUSSION

For the flow measurement of flowable media (e.g. fluids) in pipelines, especially of gas flows or vapor flows at high temperature ranges, frequently vortex, flow measuring devices are applied. In the case of such vortex, flow measuring devices, a bluff body, which forms a flow obstruction for the flowing medium, is arranged in such a manner in the flow path that the medium can flow past on both sides of the flow obstruction. In such case, vortices are shed on both sides of the flow obstruction. Over a wide range of Reynolds numbers, the vortices are shed, in such case, alternately on the two sides of the flow obstruction, so that a staggered arrangement of vortices arises. This staggered arrangement of vortices is referred to as a Kármán vortex street. In the case of vortex, flow measuring devices, the principle is utilized that the vortex shedding frequency, with which these vortices are formed, is proportional to the flow velocity, respectively to the volume flow, of the respective medium over a wide range of Reynolds numbers. The produced vortices are registered by sensor in the vortex, flow measuring device. Accordingly, from the registered vortex shedding frequency of the vortices (in the following referred to as the vortex frequency) and a calibration factor characteristic for the given type of vortex, flow measuring device, the flow velocity, respectively the volume flow, can be determined.

If process conditions within the pipeline lie in the region of a phase transformation of the flowing medium or of a material contained in the medium, then a phase transformation can take place in the medium. The medium then exists as two or more phases. Especially, a part of a gaseous medium can condense out. In the case of determining the volume flow or mass flow by a vortex, flow measuring device, there is, in such case, the problem that the device has within the measuring tube in the region of the bluff body (the measuring cross section) a reduced flow cross section compared with sections of the measuring tube upstream and downstream from the bluff body. In this way, the flow velocity of the medium in the region of the measuring cross section is locally increased. In the case of incompressible media, this effect can be relatively simply included in a calibration factor, by which the ratio (as established by the ratio of the flow cross sections) between the flow velocity in the region of the measuring cross section and the flow velocity in a cross section (subsequently referred to herein as the connecting pipe region) located upstream or downstream of the measuring cross section is taken into consideration. In the case of compressible media, such as, for example, in the case of gases, this ratio is, however, not fixed. For example, there occur in the case of gaseous media in the region of the measuring cross section a significant temperature decrease and a pressure drop. The density of the medium differs in the region of the measuring cross section significantly from the density in the connecting pipe region. Additionally, the case can occur, in which, due to the different process conditions in the region of the measuring cross section, a part of the medium condenses, while in the connecting pipe region, it evaporates again. This leads to a considerable deviation of the density of the medium in the region of the measuring cross section from the density of the medium in the connecting pipe region. In general, the problem can occur, in which, due to the process conditions present in the region of the measuring cross section, a part of the medium undergoes a phase transformation, and this phase transformation is subsequently reversed in the connecting pipe region. If the flow velocity in the connecting pipe region is calculated with a constant calibration factor, which is specifically for the respective type of vortex, flow measuring device, starting from the flow velocity measured locally in the region of the measuring cross section (alternatively the volume flow measured locally in the region of the measuring cross section), then an error arises due to the above explained effects. This problem exists especially when a phase transformation of a part of the medium occurs in the region of the measuring cross section due to the process conditions arising locally in the region of the measuring cross section.

SUMMARY OF THE INVENTION

Accordingly, an object of the present invention is to provide a method for determining a measured value of flow as well as a correspondingly embodied vortex, flow measuring device, in the case of which the occurrence of a measurement error due to a phase transformation occurring locally in the region of the measuring cross section for a part of the medium is prevented.

The object is achieved by a method for determining mass flow of an, at least at times, at least two-phase medium flowing through a measuring tube of a vortex, flow measuring device. In such case, the measuring tube has in a measuring cross section at least one bluff body for producing vortices and, by sensor registering of the produced vortices, a flow velocity of the medium in the region of the measuring cross section is determined. The method includes, in such case, steps as follows:

A) determining density of the medium in the region of the measuring cross section from the specific, total enthalpy of the medium in the region of the measuring cross section, from the flow velocity of the medium in the region of the measuring cross section, from a static pressure of the medium in the region of the measuring cross section and from a static temperature of the medium in the region of the measuring cross section; and B) determining mass flow from the determined flow velocity, the determined density and a flow cross section of the medium in the region of the measuring cross section.

Since, according to the present invention, the density of the medium in the region of the measuring cross section is determined, it is possible from this, together with the flow velocity in the region of the measuring cross section (as registered by the vortex, flow measuring device locally in the region of the measuring cross section is) and the flow cross section of the medium in the region of the measuring cross section (as known from the device dimensions), to calculate the correct mass flow of the medium. Since mass flow is constant at all points along the medium-conveying pipeline, the so ascertained mass flow forms also a correct value for the connecting pipe region. Since, in the case of the step of determining density (step A)), there enter the specific, total enthalpy of the medium in the region of the measuring cross section, the flow velocity of the medium in the region of the measuring cross section, the static pressure of the medium in the region of the measuring cross section and the static temperature of the medium in the region of the measuring cross section, it is taken into consideration that, in given cases, a part of the medium has undergone a phase transformation. A measurement error in the determined mass flow caused by the fact that, locally in the region of the measuring cross section, a phase transformation of a part of the medium has taken place is, thus, prevented.

In the case of the method of the invention (and correspondingly also in the case of the subsequently explained vortex, flow measuring device of the invention), in each case, the physical variable given in the respective claim can be determined or, alternatively an alternative physical variable characteristic for this variable can be determined, so that, from the alternative physical variable, due to generally known, physical relationships, the respectively set forth, physical variable is obtainable. This basic principle holds especially for determining flow velocity, density (compare step A)) and mass flow (compare step B)). An alternative, physical variable for the flow velocity is, for example, the volume flow. Also, in the case of the respectively set forth physical variables, which can be taken into consideration for the determining (compare e.g. steps A) and B)), in each case, the physical variable set forth in the respective claim can be taken into consideration or alternatively another physical variable, in the case of which, due to generally known, physical relationships, it is known that these can be correspondingly taken into consideration for the determining. This basic principle holds especially for the density, the specific, total enthalpy, the flow velocity, the static pressure and the static temperature in the case of determining density (compare step A)) as well as for the flow velocity, the density and the flow cross section in the case of determining mass flow (compare step B)). These basic principles hold correspondingly also in the case of the subsequently explained determining of physical variables (e.g. in reference to further developments), but this will not be pointed out each time explicitly.

As is generally known in the technical field, the sum of the static pressure and the dynamic pressure of a flowing medium gives its total pressure. Correspondingly, the sum of the static temperature and the dynamic temperature of a flowing medium gives its total temperature. In such case, corresponding sensors are known in the technical field, by which static pressure and static temperature of a flowing medium, especially of the flowing medium in the region of the measuring cross section, are registerable.

The medium is generally a flowable medium, which can be formed of a (single) material (e.g. $H_2O$) or a mixture (e.g. air containing water vapor or steam). The medium exists especially in a gaseous phase, wherein a part of the same is present at times, or durably, in a second phase (liquid or solid). In such case, the first and second phases can be formed of one and the same material, of which a first part is present in a first phase (respectively, aggregate state) and a second part is present in a second phase (respectively, aggregate state). If the medium is composed of a plurality of materials (e.g. different gases, especially air containing steam), then, at least partially, there condenses (i.e. phase transformation into the liquid phase) or freezes (i.e. phase transformation into the solid phase) especially only one material of the same in the case of the said process conditions. Furthermore, the medium can also entrain at least one other phase, such as, for example, solid particles (e.g. sand or dust), in the case of which, for the said process conditions, however, no phase transformation takes place. The medium can thus also have more than only two phases.

The measuring tube, in which the bluff body is arranged, especially forms a part of the vortex, flow measuring device and is inserted into a pipeline carrying the flowing medium. Alternatively, it can also form an integral component of the respective pipeline. The vortices produced by the bluff body in the flowing medium form especially Kármán vortices, which are registerable by at least one corresponding vortex sensor of the vortex, flow measuring device. The bluff body includes especially at least two shedding edges formed in such a manner that, in use, Kármán vortices are shed on these. The specific, total enthalpy is especially formed by the sum of the specific enthalpy and the specific, kinetic energy of the medium.

In a further development, the steps of determining the flow velocity, determining density (compare step A)) and determining mass flow (compare step B)) are performed in the vortex, flow measuring device. Especially, the vortices produced by the bluff body are registered by sensor (by at least one correspondingly formed sensor) and the following steps of determining are performed by a correspondingly formed electronics of the vortex, flow measuring device. The electronics can, in such case, be embodied digitally and/or analogly, such as is generally known in the technical field.

As a rule, the specific, total enthalpy in the region of the measuring cross section cannot be directly determined. In a further development, the specific, total enthalpy of the medium in the region of the measuring cross section is determined from the (static) pressure and the (static) temperature of a system, from which the flowing medium is removed and in which the medium is at rest before its removal. In such a resting system, the total pressure and the total temperature correspond, respectively, to the static pressure and the static temperature of the medium. Especially, the medium in this system exists in only one phase, such as, for example, the gaseous phase. Especially, it is assumed that this specific, total enthalpy is maintained by the medium on the path of the system up to the measuring cross section. In such case, especially the simplifying assumption is made that a stationary flow of the medium is involved and that, between the system and the measuring cross section, no heat sources exist, that no heat flow to, or from, the medium occurs, that no friction occurs and that no change of potential energy occurs. The specific, total enthalpy in a system, in which the medium in question is at rest, corresponds to the specific enthalpy. This can be determined based on known correlations from the (static, respectively total) pressure and the (static, respectively total) temperature of the medium in the system. If the medium is composed of a plurality of materials (elements, such as e.g. $O_2$, or compounds, such as e.g. $H_2O$) with, in each case, known mass fractions, then the specific, total enthalpy can be determined, in each case, separately for the different materials. Based on the respective mass fractions of the different materials, then the specific, total enthalpy for the medium, as a whole, can be determined.

In a further development, the specific, total enthalpy of the medium in the region of the measuring cross section is determined from a known, specific, total enthalpy of the medium in a section located upstream or downstream from the measuring cross section taking into consideration heat transfer to the flowing medium from the upstream or downstream section to the measuring cross section. Especially, the section, in which the known, specific, total enthalpy is present, lies upstream from the region of the measuring cross section. Especially, the section can also be the above set forth system, from which the flowing medium is removed and in which the medium is at rest before its removal. Alternatively, it can, however, also be another section along the flow path of the medium, where its specific, total enthalpy is known. The heat transfer to the flowing medium from the section, in which the specific, total enthalpy of the medium is known, up to the region of the measuring cross section can, depending on application, be a heat supply or a heat removal. Furthermore, the heat transfer to the medium is, such as explained below in detail, dependent on the mass flow of the medium.

In a further development, the static pressure and the static temperature of the medium in the region of the measuring cross section are registered. These measured values can be taken into consideration for determining density of the medium (compare step A)). Especially, at least one pressure sensor is provided in the region of the measuring cross section for registering the static pressure. In a further development, at least one temperature sensor is provided in the region of the measuring cross section for registering the static temperature.

In a further development, the flowing medium contains at least one material, which, at least in the case of a part of the possible (respectively, in question) process conditions, is present in the region of the measuring cross section as a first mass fraction in a first phase (respectively, aggregate state) and as the remaining, second mass fraction of this material in a second phase (respectively, aggregate state). The material in this connection is an element (e.g. $O_2$, $N_2$, etc.) or a compound (e.g. $CO_2$, $H_2O$, etc.), which, especially in the case of passing through the respective phase transformation, remains chemically unchanged. The medium can, in such case, such as explained above, also be composed of a plurality of materials (e.g. of a gas mixture, a gas mixture with liquid fractions, etc.), wherein preferably the mass fractions of the individual materials are known. In such case, it is preferred that, in the case of the process conditions in question, only exactly one material can be present in two phases (respectively, aggregate states) and the additional materials are present, in each case, only in exactly one phase. In a further development, in such case, the first phase is gaseous and the second phase is liquid. Especially, the flowing medium is formed by steam, in the case of which, at least in the case of the process conditions in question in the region of the measuring cross section, a part can condense out, so that wet steam is present. Alternatively, the medium can be formed, for example, also by air carrying steam, in the case of which, at least in the case of the process conditions in question in the region of the measuring cross section, a part of the entrained steam can condense out.

In a further development, the first mass fraction of the material is determined by solving for the first mass fraction of the material in the first phase in an equation, in which the specific, total enthalpy of the medium in the region of the measuring cross section is expressed by the sum of the kinetic energy of the medium in the region of the measuring cross section, the specific enthalpy of the material in the first phase in the region of the measuring cross section times the first mass fraction of the material, the specific enthalpy of the material in the second phase in the region of the measuring cross section times the second mass fraction of the material and, in given cases, further, specific enthalpies in the region of the measuring cross section of further material contained in the medium in their respective phases times their respective mass fractions. Therefrom, also the second mass fraction of the material in the second phase can be determined. If the medium is formed of a plurality of materials, then the mass fractions of the respective materials should be known. Accordingly, such as will be explained below, the density present in the region of the measuring cross section can also be correctly determined when a part of a material passes through a phase transformation. In a further development, the density of the medium in the region of the measuring cross section is determined from the first mass fraction of the material in the first phase and its density in the region of the measuring cross section, the second mass fraction of the material in the second phase and its density in the region of the measuring cross section as well as, in given cases, further mass fractions of additional, materials contained in the medium in their respective phases and their respective densities in the region of the measuring cross section.

In a further development, at least one the following variables present in the region of the measuring cross section is determined from the static pressure present for the medium in the region of the measuring cross section and from the static temperature present for the medium in the region of the measuring cross section:
  the specific enthalpy of the material in the first phase in the region of the measuring cross section;
  the specific enthalpy of the material in the second phase in the region of the measuring cross section;
  other specific enthalpies of additional materials contained in the medium in their respective phases in the region of the measuring cross section;
  density of the material in its first phase in the region of the measuring cross section;
  density of the material in its second phase in the region of the measuring cross section; and/or
  density of additional materials contained in the medium in their respective phases in the region of the measuring cross section.

As is generally known, the specific enthalpy of the respective material in a certain phase (respectively, aggregate state) of the same can be determined based on its static pressure and its static temperature. Especially used for this are corresponding correlations. Also, the density of the respective material in a certain phase (respectively, aggregate state) of the same can be determined based on its static pressure and its static temperature. In this way, the variables required for the method of the invention can be determined in simple manner based on the static pressure and the static temperature present locally in the region of the measuring cross section.

In a further development, earlier ascertained dependencies of the density of the medium in the region of the measuring cross section on the specific, total enthalpy of the medium in the region of the measuring cross section, the flow velocity of the medium in the region of the measuring cross section, the static pressure of the medium in the region of the measuring cross section and the static temperature of the medium in the region of the measuring cross section are electronically stored and, in the case of the step of determining density of the medium in the region of the measuring cross section, the density is determined based on the values actually present in the region of the measuring cross section for the specific, total enthalpy of the medium in the region of the measuring cross section, the flow velocity of the medium in the region of the measuring cross section, the static pressure of the medium in the region of the measuring cross section and the static temperature of the medium in the region of the measuring cross section. The ascertaining of the dependencies of the density of the respectively set forth, physical variables can occur especially experimentally earlier. Especially in the context of a calibration measurement, in each case, different, known mass flow values can be set in the relevant vortex, flow measuring device and the additional, physical variables (specific, total enthalpy, flow velocity, static pressure, static temperature), which are present in the region of the measuring cross section, registered, or determined. From the flow velocity (or also the locally measured volume flow) measured locally in the measuring cross section and the, in each case, known mass flow value, then the density of the medium in the region of the measuring cross section at the relevant process conditions can be determined. This experimental ascertaining is especially performed for different values of the above set forth physical variables (specific, total enthalpy, flow velocity, static pressure, static temperature) present, in each case, in the region of the measuring cross section, so that the dependencies of the density in the region of the measuring cross section on these variables can be determined. Alternatively to the above explained, experimental ascertaining, such ascertaining can also occur by calculation. The "electronic storing" occurs especially in an electronic memory of the vortex, flow measuring device, which can access a processor unit of the vortex, flow measuring device. If one or more of the actually (in use) registered or determined, physical variables (specific, total enthalpy, flow velocity, static pressure, static temperature) does not agree exactly with, in each case, one of the electronically stored, physical variables (but, instead, lies, for example, between two values), then, in determining density, a corresponding interpolation can be performed between the respective, neighboring, stored values. Fundamentally, in the context of this further development, the density can be determined, or a variable characteristic for the density can be determined, from which the density is obtainable based on generally known, physical relationships. Alternatively to density, for example, the first mass fraction of the material, which can be present in two phases, can be ascertained, in each case, earlier for the different process conditions and its dependencies on the above set forth, physical variables (specific, total enthalpy, flow velocity, static pressure, static temperature) can be electronically stored. Furthermore, in the context of this further development, also another, physical variable, which needs to be determined, such as, for example, the volume flow in the connecting pipe region, can be determined (in the context of calibration measurements or by calculation). In accordance with these explained variations, also the subsequently explained table can be embodied in a varied manner.

In a further development, the dependencies of the density of the medium in the region of the measuring cross section on the specific, total enthalpy of the medium in the region of the measuring cross section, the flow velocity of the medium in the region of the measuring cross section, the static pressure of the medium in the region of the measuring cross section and the static temperature of the medium in the region of the measuring cross section are stored in the form of a multidimensional table.

The present invention relates, furthermore, to a vortex, flow measuring device for determining mass flow of an, at least at times, at least two-phase medium, which in use flows through a measuring tube, wherein the vortex, flow measuring device comprises at least one bluff body arranged inside the measuring tube for producing vortices, at least one vortex sensor for registering the produced vortices and an electronics for determining flow velocity of the medium in the region of the measuring cross section. The electronics of the vortex, flow measuring device is, in such case, embodied in such a manner that it can determine density of the flowing medium in the region of the measuring cross section from the specific, total enthalpy of the medium in the region of the measuring cross section, from the flow velocity of the medium in the region of the measuring cross section, from a static pressure of the medium in the region of the measuring cross section and from a static temperature of the medium in the region of the measuring cross section and that from the determined flow velocity, the determined density and a flow cross section of the medium in the region of the measuring cross section, it can determine the mass flow of the medium. With the vortex, flow measuring device of the invention, the further developments and variants explained above in reference to the method of the invention are implementable in corresponding manner. The above explained method steps are executed by the vortex, flow measuring device of the invention, in so far as this is technically sensible, especially by a correspondingly embodied electronics. In a further development, the vortex, flow measuring device includes in the region of the measuring cross section a pressure sensor for determining the static pressure of the medium in the region of the measuring cross section and/or a temperature sensor for determining the static temperature of the medium in the region of the measuring cross section.

BRIEF DESCRIPTION OF THE DRAWINGS

Other advantages and utilities of the invention will become evident based on the following description of an example of an embodiment with reference to the appended drawing, the figures of which show as follows.

DETAILED DISSCUSSION IN CONJUNCTION WITH THE DRAWINGS

Figure 1:
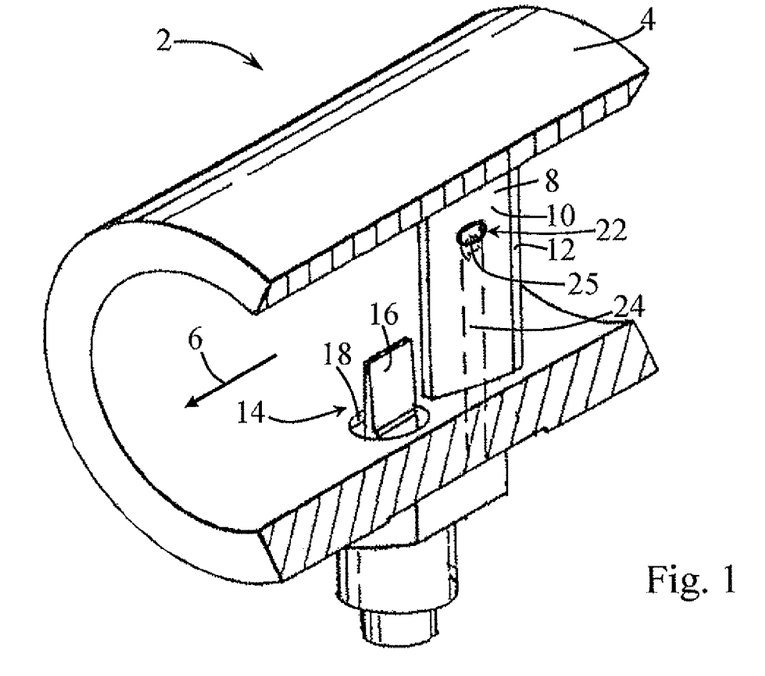
FIG. 1 is a schematic representation of a vortex, flow measuring device in perspective, partially cut open view.

FIG. 1 shows, schematically, a vortex, flow measuring device 2 in perspective view. The vortex, flow measuring device 2 includes a measuring tube 4, which is shown in FIG. 1 partially cut open. In use, the measuring tube 4 is inserted in such a manner into a pipeline (not shown) that the flowing medium in the pipeline flows through the measuring tube 4 in a flow direction 6. The vortex, flow measuring device 2 includes a bluff body 8, which extends transversely to the flow direction 6 in the measuring tube 4 in such a manner that, on both sides of the bluff body, in each case, a flow path is formed. Especially, the bluff body 8 extends in the direction of a diameter across the total inner cross section of the measuring tube 4. The bluff body 8 is embodied, in such case, in such a manner that it has, on the side (hidden in FIG. 1) facing the flow, a strike surface, against which the respective medium flows. Limiting both sides of the strike surface are lateral surfaces 10, wherein the two lateral surfaces 10 are tilted toward one another in the flow direction 6, so that the bluff body 8 has an essentially Δ-shaped cross section. Provided on both sides of the strike surface are vortex shedding edges 12 (in FIG. 1, only one of the two shedding edges 12 is visible), each of which is the transition from the strike surface to the respectively neighboring, lateral surface 10. As is evident based on FIG. 1, the respective medium can flow past on both sides of the bluff body 8, wherein, such as explained above, alternatingly on the two shedding edges 12, in each case, vortices are shed. Accordingly, there forms, in use, in the region behind the two shedding edges 12, a Kármán vortex street.

The vortex, flow measuring device 2 includes, furthermore, a vortex sensor 14 arranged downstream from the bluff body 8. The vortex sensor 14 comprises, in the present example of an embodiment, a paddle 16, which extends into the flow path through a bore 18 formed in the measuring tube 4. In such case, the paddle 16 is arranged in a rest position parallel to the bluff body 8 and aligned therewith. Paddle 16 can be pivoted in a direction perpendicular to the flow direction 6 and perpendicular to the direction of elongation of the paddle 16. As a result, the paddle 16 can, in use, move to and fro under the influence of pressure fluctuations, especially due to the formed vortices. The swinging movements of the paddle 16 are transduced by means of a corresponding vortex sensor into an electrically processable measurement signal. The vortex sensor can be, for example, a DSC-sensor (DSC: differential switched capacitor. In this sensor type, the swinging movements of the pivotable section are converted by means of two electrically switched capacitors into differential electrical charge changes. An electronics (not shown) of the vortex, flow measuring device 2, among other things, evaluates the sensor signals provided by the vortex sensor 14. Especially, the electronics can determine the registered vortex frequency and from this the flow velocity (respectively, supplementally or alternatively, the volume flow). This will be explained below in further detail. Along with that, the electronics can especially determine and/or evaluate physical variables, evaluate sensor signals of additional sensors, perform wired or wireless communication, etc.

FIG. 1 shows, furthermore, in dashed line representation, an alternative variant in the form of a vortex sensor 22 embodied within the bluff body 8. In the case of this alternative variant, there is provided within the bluff body 8 parallel to the direction of elongation of the bluff body 8 a blind bore 24 for accommodating the vortex sensor 22. This blind bore 24 includes at least one opening 25, which produces a fluid connection between the respective medium inside of the measuring tube 4 and the blind bore 24. Correspondingly, a vortex sensor 22 arranged within the blind bore 24 can register pressure fluctuations, which occur in the measuring tube 4 downstream from the shedding edges 10, as especially brought about by vortices, and convert such into an electrically processable, measurement signal.

Figure 2:
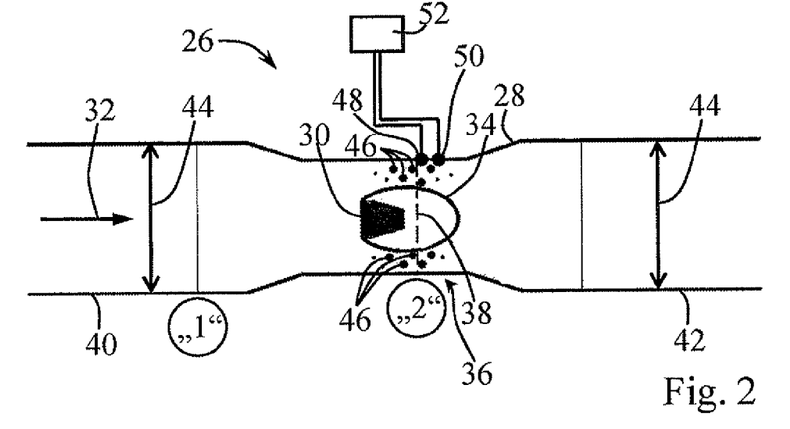
FIG. 2 is a schematic, cross sectional view containing the axis of a measuring tube of a vortex, flow measuring device for illustrating the occurrence of a phase transformation in the region of the measuring cross section.

FIG. 2 shows a schematic cross sectional view containing the axis of a measuring tube 28 of a vortex, flow measuring device 26. In the following, essentially those details will be treated, which are decisive for explaining the occurrence of a phase transformation in the region of the measuring cross section. Arranged within the measuring tube 28 is a bluff body 30, which is shown in FIG. 2 in cross sectional view perpendicular to its direction of elongation. Bluff body 30 has an essentially trapezoidal cross section, wherein its larger base faces the flow (compare flow direction 32 in FIG. 2). Forming behind the bluff body 30 is a dead water region 34, which has in the cross section essentially the shape of an ellipse and is presented schematically in FIG. 2. The region of the bluff body 30 and the thereon following, dead water region 34 is referred to as measuring cross section 36, whose center 38 (relative to the flow direction 32) is shown in FIG. 2 by the dashed line. The region of the center 38 is especially where the vortex sensor (not shown in FIG. 2) separate from the bluff body 30, such as, for example, the paddle, measures the flow velocity. The flow cross section for the flowing medium is reduced in the region of the measuring cross section 36. This effect is supplementally amplified by tapering the measuring tube 28 narrower around the region of the measuring cross section 36 from the connecting pipes 40, 42, each of which has an connecting pipe cross section 44. Furthermore, the vortex, flow measuring device 26 includes in the region of the measuring cross section 36 a temperature sensor 48 for registering the static temperature of the medium (in the region of the measuring cross section 36) as well as a pressure sensor 50 for registering the static pressure of the medium (in the region of the measuring cross section 36). The temperature sensor 48 and the pressure sensor 50 are, in each case, connected with an electronics 52 of the vortex, flow measuring device 26.

If, for example, humid air (the medium) flows through a pipeline, into which the vortex, flow measuring device 26 is inserted, then the humid air in the pipeline can be completely gaseous, so that only one phase is present. In the region of the measuring cross section 36, due to the reduced flow cross section, the flow velocity of the medium increases, which leads to a sinking of its temperature and its pressure. With these process conditions in the region of the measuring cross section 36, thus, the phase boundary gas-liquid (alternatively: gas-solid) for the water contained in the air can be crossed, so that the water contained in the humid air at least partially condenses (respectively, alternatively desublimes). This is shown schematically in FIG. 2 by the droplets 46 in the region of the measuring cross section 36. After the measuring cross section 36, once the flow cross section has returned to its original size, the water returns to the gaseous state and the droplets 46 disappear. The density of the medium (here: humid air) deviates, thus, in the region of the measuring cross section 36 from its density in the connecting pipe regions 40, 42.

Alternatively, the process conditions already in the pipeline can be such that a part of the water contained in the humid air is condensed (respectively, alternatively desublimed) and is carried in liquid phase (especially as liquid droplets) (respectively, alternatively: solid phase particles). Due to the reduced flow cross section in the region of the measuring cross section 36, an additional part of the gaseous water contained in the wet air condenses (respectively, alternatively: desublimes) in this region. After the measuring cross section 36, once the flow cross section has returned to its original size, the additional part returns to the gaseous state and the medium essentially returns to the equilibrium between liquid and gaseous water, such as it was in the upstream connecting pipe region 40. Also in this case, the density of the medium (here: humid air) deviates in the region of the measuring cross section 36 from its density in the connecting pipe regions 40, 42. In the case of humid air, which has a number of different materials ($O_2$, $N_2$, $CO_2$, $H_2O$, etc.), and generally in the case of media, which have a number of different materials, in the case of application of the method of the invention, preferably the process conditions in the connecting pipe regions 40, 42 and in the region of the measuring cross section 36 are such that, at most, one material is present in two phases (respectively, that, in given cases, the occurrence of a phase transformation of additional materials present in two phases can be neglected). Alternatively, however, also the case can occur, in which the medium is formed of only one material (e.g. $H_2O$), which in the case of a variant is present in the connecting pipe regions 40, 42 in only one phase (especially gas phase) and wherein in the region of the measuring cross section 36 a part condenses (i.e. gas-liquid phase mixture) or desublimes (i.e. gas-solid phase mixture). In the case of an additional variant, in the case of the medium formed of only one material, already in the connecting pipe regions 40, 42 a part of the same is condensed or desublimed, wherein this part then increases in the region of the measuring cross section 36.

In the following, forms of embodiment of the method of the invention and the derivation of the respectively relevant, physical formulas will now be explained. As known in the technical field, a flow field can be described by the Navier-Stokes equations. For a stationary control volume, the Navier-Stokes equations read in integral form as follows, wherein Equation (1) expresses the conservation of mass, Equation (2) the conservation of momentum and Equation (3) the conservation of energy.

$$\frac{\partial}{\partial t}\int_V \rho dV + \int_S \rho \vec{u}\cdot\vec{n}dS = 0 \tag{1}$$

$$\frac{\partial}{\partial t}\int_V \rho \vec{u}dV + \int_S (\rho \vec{u}\vec{u})\vec{n}dS = -\int_S p\vec{n}dS + \int_V \rho \vec{B}dV + \int_S \tau\vec{n}dS \tag{2}$$

$$\frac{\partial}{\partial t}\int_V \rho\left(e+\frac{u^2}{2}\right)dV + \int_S \rho\left(e+\frac{u^2}{2}\right)\vec{u}\cdot\vec{n}dS = \tag{3}$$
$$-\int_S p\vec{u}\cdot\vec{n}dS + \int_V \rho \vec{B}\cdot\vec{u}dV + \int_S \tau\vec{u}\cdot\vec{n}dS - \int_S \vec{q}\cdot\vec{n}dS - \int_V \rho QdV$$

In such case, t stands for time, V the stationary control volume, $\rho$ the density, S the boundary surface of the stationary control volume, $\vec{u}$ the velocity vector, $\vec{n}$ the normal vector of the boundary surface, p the pressure, $\vec{B}$ the specific body force, u the velocity magnitude, $\tau$ the viscous stress tensor, e the specific, inner energy, $\vec{q}$ the heat flow vector and Q the specific, volumetric energy addition.

With the assumption that the flow is stationary, there results from the conservation of mass (compare Equation (1)):

$$\int_S \rho \vec{u}\cdot\vec{n}\, dS = 0 \tag{4}$$

This means that the mass flow into the control volume (expressed in Equation (5) by the index 1) equals the mass flow out of the control volume (expressed in Equation (5) by the index 2). This relationship is expressed in the following Equation (5). This can be illustrated based on FIG. 2, in which a Position "1" in the region of the upstream connecting pipe 40 is indicated by the "1" in the circle, where flow velocity $u_1$, density $\rho_1$ and flow cross section $A_1$ are present. Further illustrated in FIG. 2 is a Position "2" in the region of the center 38 of the measuring cross section 36, as indicated by the "2" in the circle, where flow velocity $u_2$, density $\rho_2$ and flow cross section $A_2$ are present. The control volume in the case of this illustrative example is formed, for example, by the volume enclosed between the Positions "1" and "2" as well as by the measuring tube 28, wherein the volume of the bluff body 30 and the volume of the dead water region 34 are omitted.

$$\rho_1 u_1 A_1 = \rho_2 u_2 A_2 \tag{5}$$

In general form, this means that the mass flow expressed by the following Equation (6) is constant for stationary flow in a pipe. In such case, in Equation (6), $\dot{m}$ is the mass flow, $\rho$ the density, u the average flow velocity and A the available flow cross section. Especially, mass flow does not change along the flow path of the medium. This principle is utilized in the method of the invention, such as will be below explained in detail. In the method of the invention, namely the mass flow in the region of the measuring cross section is determined correctly based on the process conditions present locally in the region of the measuring cross section. This mass flow exists (in the case of assumption of a stationary flow) at each position along the flow path, independently of possibly arising density changes of the flowing medium.

$$\dot{m}=\rho u A \tag{6}$$

In the case of incompressible media, such as, for example, in the case of liquids, using a vortex, flow measuring device to determine the volume flow $\dot{V}_A$ present in the connecting pipe region is relatively simple. The vortex shedding frequency f of the vortices formed by the bluff body, as registerable by sensor, is, over a wide Reynolds number range, proportional to the flow velocity locally present in the region of the measuring cross section as well as to the volume flow locally present in the region of the measuring cross section. Since, in the case of incompressible media, the density of the medium along its flow path remains constant, the vortex shedding frequency is also proportional to the volume flow $\dot{V}_A$ in the connecting pipe region as well as to the flow velocity $u_A$ in the connecting pipe region. This can be accounted for by a corresponding calibration factor $k_f$. The calibration factor $k_f$ is, in such case, especially specifically for the respective type of vortex, flow measuring device. The explained relationships are expressed by the following Equation (7), where $A_A$ represents the flow cross section in the connecting pipe region:

$$\dot{V}_A = u_A\, A_A = \frac{f}{k_f} \tag{7}$$

In the case of compressible media, in contrast, the density $\rho$ is a function of the local, static pressure p and static temperature T, this being expressed by the following Equation (8):

$$\rho = \rho(p,T) \tag{8}$$

In the case of an exclusively gaseous (i.e. single phase) medium, the dependence of density on pressure and static temperature can be relatively simply determined. If, however, the process conditions in the region of the measuring cross section lie in a region of phase transformation of a material contained in the medium, then the density of the medium is supplementally determined by the portions of the material present in the different phases. In such case, the entire fraction of the material does not undergo the phase transformation abruptly. Rather, the phase transformation occurs gradually. In a phase transformation, a phase transformation enthalpy of the relevant phase transformation, such as, for example, a condensation enthalpy, is given off, or absorbed, as the case may be.

Due to its manner of operation, a vortex, flow measuring device can relatively exactly determine the flow velocity u of the medium (respectively, its volume flow) present in the region of the measuring cross section, even when the medium is present in two or more phases. Due to the high density differences between liquid (respectively, alternatively: solid) and gaseous phases, no matter that the liquid (respectively, alternatively solid) phase amounts to a considerable mass fraction, the gaseous phase forms the predominant part of the volume. Preferably, the mass fraction $x_g$ of the gaseous phase is >0.5.

For determining mass flow, the density locally in the region of the measuring cross section must be determined as exactly as possible. The determining of density of the medium in the region of the measuring cross section will be explained below based on the phase transformation, gas-liquid. The density is in the case of all explained forms of embodiment, such as will be explained in detail below, determined from the specific, total enthalpy, from the flow velocity, from the static pressure and from the static temperature, wherein in the case of all physical variables reference is to the region of the measuring cross section. In such case, the density in the region of the measuring cross section is determined from the first mass fraction of the material (e.g. H$_2$O) in the first (e.g. gaseous) phase and its density $\rho_g$ in the region of the measuring cross section, the second mass fraction of the material in the second (e.g. liquid) phase and its density $\rho_l$ in the region of the measuring cross section as well as, in given cases, from mass fractions of additional materials contained in the medium (e.g. dry air) in their respective (e.g. gaseous) phases and their respective densities ρr in the region of the measuring cross section. If the medium is formed by exactly one material (e.g. H$_2$O), which can be present in the case of the process conditions both in gaseous as well as also in liquid phase, then the density ρ of the medium in the region of the measuring cross section can be expressed as a function of the static pressure p in the region of the measuring cross section, the static temperature in the region of the measuring cross section and the mass fraction of the gaseous phase $x_g$. This relationship is presented in the following Equation (9), wherein $\rho_g(p, T)$ is the density of the gaseous phase of this material as a function of the static pressure p and the static temperature T and $\rho_l(p, T)$ is the density of the liquid phase of this material as a function of the static pressure p and the static temperature T. The pressure- and temperature dependence of the density of the respective phases of the respective material is known in such case (for example, obtainable from corresponding correlations for the relevant material).

$$\rho = \rho(p, T, x_g) = \frac{1}{\frac{x_g}{\rho_g(p, T)} + \frac{1-x_g}{\rho_l(p, T)}} \quad (9)$$

If the medium (e.g. humid air) is formed of a plurality of materials and includes (exactly) one material (e.g. H$_2$O), which, at least in the case of a part of the possible process conditions in the region of the measuring cross section, is present in two phases, i.e. the gaseous and the liquid phases, then the density ρ of the medium in the region of the measuring cross section can be expressed as a function of the static pressure p in the region of the measuring cross section, the static temperature in the region of the measuring cross section, the assumed as known, mass fraction x of this material (total mass of the material relative to the total mass of the medium) and the mass fraction of the gaseous phase $x_g$ (total mass of the material in the gaseous phase relative to the total mass of the material) in the region of the measuring cross section. This relationship is presented in the following Equation (10), wherein $\rho_r(p, T)$ is the density of the residual, gaseous medium (e.g. dry air) as a function of the static pressure p and the static temperature T (this function for the density $\rho_r$ is known):

$$\rho = \rho(p, T, x, x_g) = \frac{1}{x\left(\frac{x_g}{\rho_g(p, T)} + \frac{1-x_g}{\rho_l(p, T)}\right) + \frac{1-x}{\rho_r(p, T)}} \quad (10)$$

As evident from Equations (9) and (10), the density ρ of the medium (e.g. humid air) in the region of the measuring cross section can be expressed as a function of the first mass fraction x*$x_g$ of the material (e.g. H$_2$O) in a first (here: gaseous) phase and its density $\rho_g$ in the region of the measuring cross section, the second mass fraction x*(1−$x_g$) of the material in a second (here: liquid) phase and its density $\rho_l$ in the region of the measuring cross section as well as, in given cases, further mass fractions (1-x) of additional material (e.g. dry air) contained in the medium in their respective phases (here: gaseous) and their respective densities $\rho_r$ in the region of the measuring cross section. For correct determining of the density ρ of the medium, thus, the mass fraction of the gaseous phase $x_g$ must be determined. Used for this is Equation (3), which forms one of the Navier-Stokes equations and expresses the conservation of energy. With the simplifying assumption that stationary flow is present, that no heat sources exist, that no heat flow to, or from, the medium occurs, that no friction occurs and that no changing of the potential energy occurs, the first as well as the fourth to seventh terms of Equation (3) are, in each case, equal to zero. Accordingly, there results for the conservation of energy the following Equation (11):

$$\int_S \rho\left(e + \frac{u^2}{2}\right)\vec{u} \cdot \vec{n}dS + \int_S p \cdot \vec{u} \cdot \vec{n}dS = 0 \quad (11)$$

$$\int_S \rho\left(h + \frac{u^2}{2}\right)\vec{u} \cdot \vec{n}dS = \int_S \rho \cdot h_0 \cdot \vec{u} \cdot \vec{n}dS = 0$$

In such case, in Equation (11), h is the specific enthalpy, which can be expressed as given in Equation (12). Furthermore, $h_0$ is the specific, total enthalpy of the medium, which can be expressed as given in Equation (13).

$$h = e + \frac{p}{\rho} \quad (12)$$

$$h_0 = h + \frac{u^2}{2} \quad (13)$$

In reference to the above explained control volume, it holds, accordingly, that the flow of the specific, total enthalpy into the control volume (indicated in Equation (14) by the index 1) equals the flow of the specific, total enthalpy out of the control volume (indicated in Equation (14) by the index 2), as is set forth below in Equation (14). Taken with Equation (5), there results from Equation (14) that the flow of the specific, total enthalpy $h_0$ in the case of the above (simplifying) assumptions is constant, this being shown below by Equation (15).

$$A_1 \rho_1 u_1 \left(h_1 + \frac{u_1^2}{2}\right) = A_2 \rho_2 u_2 \left(h_2 + \frac{u_2^2}{2}\right) \quad (14)$$

$$h_1 + \frac{u_1^2}{2} = h_2 + \frac{u_2^2}{2} = h_0 = const \quad (15)$$

The specific, total enthalpy of the medium can, furthermore, be expressed as the sum of the kinetic energy of the medium in the region of the measuring cross section, the specific enthalpy $h_g(p, T)$ of the material (e.g. $H_2O$) in the first (e.g. gaseous) phase in the region of the measuring cross section times the first mass fraction of the material in the first phase, the specific enthalpy $h_l(p, T)$ of the material in the second (e.g. liquid) phase in the region of the measuring cross section times the second mass fraction of the material in the second phase and, in given cases, further, specific enthalpies $h_r(p, T)$ of additional, materials contained in the medium (e.g. dry air) in their respective phases (especially gaseous) times their respective mass fractions. If the medium is formed exclusively of one material (e.g. $H_2O$), which is present, at least in the case of a part of the possible process conditions, in two phases, then Equation (16) results for the given relationship. If the medium (e.g. humid air) is formed of a plurality of materials and includes (exactly) one material (e.g. $H_2O$), which is present at least in the case of a part of the possible process conditions in the region of the measuring cross section in two phases, i.e. the gaseous and liquid phases, then Equation (18) results for the given relationship. If these Equations (16), respectively (18), are solved for the mass fraction of the material (e.g. $H_2O$) in the first (e.g. gaseous) phase, then Equations (17), respectively (19) result.

$$h_0 = \left(\frac{1}{2}u^2 + x_g\, h_g(p, T) + (1 - x_g)h_l(p, T)\right) \quad (16)$$

$$x_g = \frac{h_0 - \frac{1}{2}u^2 - h_l(p, T)}{h_g(p, T) - h_l(p, T)} \quad (17)$$

$$h_0 = \frac{1}{2}u^2 + x\, x_g\, h_g(p, T) + x(1 - x_g)h_l(p, T) + (1 - x)h_r(p, T) \quad (18)$$

$$x_g = \frac{\frac{h_0 - \frac{1}{2}u^2}{x} - h_l(p, T) - \frac{1-x}{x}h_r(p, T)}{h_g(p, T) - h_l(p, T)} \quad (19)$$

In such case, the specific enthalpy $h_g(p, T)$ of the material (e.g. $H_2O$) in the first (e.g. gaseous) phase, the specific enthalpy $h_l(p, T)$ of the material in the second (e.g. liquid) phase as well as the specific enthalpy $h_r(p, T)$ of additional, material contained in the medium (e.g. dry air) can be determined based on the values for the static temperature T and the static pressure p present in the region of the measuring cross section based on correlations, which exist for the different materials. In order to be able to determine the mass fraction of the material (e.g. $H_2O$) in the first (e.g. gaseous) phase, it is necessary, thus, that still the specific, total enthalpy $h_0$ of the medium in the region of the measuring cross section be determined. Options for this are explained below.

As explained above with reference to the Equations (14) and (15), given the assumption made above toward simplification, the flow of the specific, total enthalpy $h_0$ along the flow path of the medium is constant. If the medium is taken from an (at least largely in thermodynamic equilibrium) system, in which the medium is at rest before its removal, then the specific, total enthalpy $h_0$ of the flowing medium in the region of the measuring cross section can be determined from the static (respectively, total) pressure $p_0$ and the static (respectively, total) temperature $T_0$, which the medium has within this system. The system can be formed, for example, by an autoclave with a known autoclave pressure and a known autoclave temperature. Alternatively, for the case, in which ambient air is sucked in by the pipeline in question, the system can be characterized by the ambient pressure and the ambient temperature. The medium in the system is, especially, completely gaseous. The specific, total enthalpy $h_0$ corresponds to the specific enthalpy $h(p_0, T_0)$ in the system, in which the medium in question is at rest (and in thermodynamic equilibrium). The specific enthalpy $h(p_0, T_0)$ can be determined for the respective material in its respective phase based on known correlations of the (static, respectively total) pressure $p_0$ and the (static, respectively total) temperature $T_0$ of the medium in the system. If the medium is composed of a plurality of materials (elements, such as e.g. $O_2$, or compounds, such as e.g. $H_2O$) with, in each case, known mass fractions, then the specific enthalpy $h(p_0, T_0)$ of the medium in the system can be determined, in each case, separately for the different materials in their respective phases (from the static pressure $p_0$ and the static temperature $T_0$). Based on the respective mass fractions of the different materials in the system, then the specific enthalpy $h(p_0, T_0)$ for the entire medium can be determined. In the region of the measuring cross section, the specific, total enthalpy $h_0$ of the medium is composed of the specific enthalpy $h(p, T)$ and the specific, kinetic energy $u^2/2$. This relationship is expressed in the following Equation (20).

$$h_0 \equiv h(p, T) + \frac{u^2}{2} \quad (20)$$
$$= h(p_0, T_0)$$

If heat transfer to the medium occurs along its flow path, then the specific, total enthalpy $h_{0,b}$ of the medium in the region of the measuring cross section can be determined also from a known, specific, total enthalpy $h_{0,a}$ of the medium in a section located upstream or downstream of the measuring cross section taking into consideration a heat transfer to the flowing medium from the section (index a) up to the measuring cross section (index b). This variant is expressed by the following Equation (21), wherein the term $$\int_a^b \vec{q} \cdot \vec{n}\, dS$$

stands for the heat flow across the respective system boundaries, $Q_{a-b}$ is the total heat transfer (to the flowing medium from the relevant section up to the measuring cross section b), and $\dot{m}$ is the mass flow of the medium. As evident from Equation (21), also other energy transfers to the flowing medium can in corresponding manner be taken into consideration by placing corresponding, additional terms in Equation (21).

$$\dot{m}\, h_{0,a} = \dot{m}\, h_{0,b} - \int_a^b \vec{q} \cdot \vec{n}\, dS = \dot{m}\, h_{0,b} - Q_{a-b} \quad (21)$$

$$h_{0,a} = h_{0,b} - \frac{Q_{a-b}}{\dot{m}}$$

Also present in Equation (21) is the mass flow of the medium, whose exact determination is quite clearly subject matter of the method of the invention. This problem can be solved, especially iteratively. For this, first of all, especially the known specific, total enthalpy $h_{0,a}$, which is present in the section (index a), can be applied as specific, total enthalpy of the medium in the region of the measuring cross section (e.g. in Equation (17) or (19)). Therefrom, according to the method of the invention, the mass flow can then be determined (such as is yet to be explained below in detail). The ascertained mass flow can, in turn, be applied in Equation (21). Then from this, the specific, total enthalpy $h_{0,b}$ in the region of the measuring cross section can be determined using Equation (21). This can then, in turn, be taken into consideration as the specific enthalpy of the medium in the region of the measuring cross section for determining mass flow according to the method of the invention. In such case, so many Iterations can be performed, until a sufficiently correct result is obtained, respectively until the obtained values for the mass flow are no longer changed significantly by continued iteration.

Furthermore, there is with reference to Equation (21) the opportunity that the known, specific, total enthalpy $h_{0,a}$ of the medium, when the medium is removed from a resting system, such as above described, is formed by the specific, total enthalpy of the medium in this system (compare Equation (20)). By application of Equation (21), then a heat transfer to the flowing medium on the path of the system up to the measuring cross section can be taken into consideration.

The specific, total enthalpy $h_0$ of the medium in the region of the measuring cross section obtained according to the method based on Equation (20) and/or according to the method based on Equation (21) can then be inserted into Equation (17), respectively (19). Therefrom then the mass fraction $x_g$ of the material (e.g. $H_2O$) in the first phase in the region of the measuring cross section can be calculated. The mass fraction $x_g$ can then, in turn, be inserted into Equation (9), respectively (10). Therefrom then the density of the medium in the region of the measuring cross section can be determined. The mass flow is then determined according to Equation (6) from the determined flow velocity u of the medium in the region of the measuring cross section, the determined density $\rho$ of the medium in the region of the measuring cross section and from the flow cross section A of the medium in the region of the measuring cross section.

If the volume flow of the medium in the connecting pipe region is to be determined, then the mass flow obtained according to Equation (6) must still be divided by the density of the medium present in the connecting pipe region (compare e.g. $\rho_1$ in FIG. 2). This density is, in turn, a function of the static pressure and the static temperature in the connecting pipe region. To the extent that the density is not known, it must be determined. If the medium is exclusively gas, then the density can be determined simply as a function of the static pressure and the static temperature present in the connecting pipe region. If, in contrast, also in the connecting pipe region, a material is present in two phases, then a determining of density is not directly possible. Here, for example, correspondingly, such as was described for the density in the region of the measuring cross section, also locally in the connecting pipe region, the flow velocity and the specific, total enthalpy of the medium could be determined. From these variables, together with the static pressure and the static temperature, which are present, in each case, in the connecting pipe region, then the density in the connecting pipe region could be determined.

The present invention is not limited to the examples of embodiments explained with reference to the figures. For example, the vortex, flow measuring device can be constructed in various ways, such as are known especially from the state of the art. Especially, the basic construction can correspond to a vortex, flow measuring device, such as was explained in the introduction above. Regarding the arrangement and forming of the vortex sensor, different variants are possible, such as, for example, the integral construction in the bluff body or the separate construction as a paddle, which is arranged downstream of the bluff body. Furthermore, different forms of the bluff body and different developments the shedding edges are possible. Furthermore, in the context of determining density of the medium in the region of the measuring cross section also other effects, such as, for example, friction effects, can be taken into consideration. As known to those skilled in the art, especially also Equation (2), which relates to the conservation of momentum, can be included for this.

The above explained examples of embodiments concern, in each case, the phase transformation between gas and liquid. Alternatively, the method of the invention can be implemented correspondingly for the phase transformation between gas and solid. In the latter case, instead of the pressure- and temperature dependent density and pressure- and temperature dependent specific enthalpy of the material in the liquid phase, the pressure- and temperature dependent density and the pressure- and temperature dependent specific enthalpy of the material in the solid phase are used.

Furthermore, for the case, in which the static pressure p cannot be measured locally at the relevant position (e.g. in the region of the measuring cross section; in the connecting pipe region, etc.) the static pressure p can be calculated according to the following Equation (22):

$$\frac{p}{p_t} = \left(1 + \frac{1-\gamma}{2}M^2\right)^{\frac{\gamma}{1-\gamma}} \tag{22}$$

In such case, $p_t$ is the total pressure and M the Mach number of the medium. The Mach number M is expressed by the following Equation (23), wherein u is the flow velocity of the medium and a is the velocity of sound. $\gamma$ is determined by Equation (24), wherein $c_v$ is the specific heat capacity of the medium in the case of constant volume and $c_p$ the specific heat capacity at constant pressure.

$$M = \frac{u}{a} \tag{23}$$

$$\gamma \equiv \frac{c_p}{c_v} \tag{24}$$

The invention claimed is:

1. A method for determining mass flow of an, at least at times, at least two-phase medium flowing through a measuring tube of a vortex flow measuring device, wherein the measuring tube has in a measuring cross section at least one bluff body for producing vortices and wherein, by sensor registering of the produced vortices, a flow velocity of the medium in the region of the measuring cross section is determined, the method comprising:
- A) determining density of the medium in the region of the measuring cross section from the specific total enthalpy of the medium in the region of the measuring cross section, from the flow velocity of the medium in the region of the measuring cross section, from a static pressure of the medium in the region of the measuring cross section and from a static temperature of the medium in the region of the measuring cross section; and
- B) determining mass flow from the determined flow velocity, the determined density and a flow cross section of the medium in the region of the measuring cross section.

2. The method as claimed in claim 1, wherein:
said step of determining flow velocity, density and mass flow is performed in the vortex, flow measuring device.

3. The method as claimed in claim 1, wherein:
the specific total enthalpy of the medium in the region of the measuring cross section is determined from pressure and temperature of a system, from which the flowing medium is removed and in which the medium is at rest before its removal.

4. The method as claimed in claim 1, wherein:
the specific total enthalpy of the medium in the region of the measuring cross section is determined from a known, specific total enthalpy of the medium in a section located upstream or downstream from the measuring cross section taking into consideration heat transfer to the flowing medium from the section up to the measuring cross section.

5. The method as claimed in claim 1, wherein:
static pressure and static temperature of the medium in the region of the measuring cross section are registered.

6. The method as claimed in claim 1, wherein:
the flowing medium contains at least one material, which, at least in the case of a part of the possible process conditions, is present in the region of the measuring cross section at a first mass fraction in a first phase and at the remaining, second mass fraction of this material in a second phase.

7. The method as claimed in claim 6, wherein:
the first phase is gas and the second phase is liquid.

8. The method as claimed in claim 6, wherein:
the first mass fraction of the material is determined by solving for the first mass fraction of the material in the first phase in an equation, in which the specific total enthalpy of the medium in the region of the measuring cross section is expressed by the sum of the kinetic energy of the medium in the region of the measuring cross section, the specific enthalpy of the material in the first phase in the region of the measuring cross section times the first mass fraction of the material, the specific enthalpy of the material in the second phase in the region of the measuring cross section times the second mass fraction of the material and, in given cases, further, specific enthalpies in the region of the measuring cross section of further, materials contained in the medium in their respective phase times their respective mass fractions.

9. The method as claimed in claim 8, wherein:
the density of the medium in the region of the measuring cross section is determined from the first mass fraction of the material in the first phase and its density in the region of the measuring cross section, the second mass fraction of the material in the second phase and its density in the region of the measuring cross section.

10. The method as claimed in claim 1, wherein:
at least one the following variables present in the region of the measuring cross section is determined from the static pressure present for the medium in the region of the measuring cross section, and from the static temperature present for the medium in the region of the measuring cross section:
the specific enthalpy of the material in the first phase in the region of the measuring cross section;
the specific enthalpy of the material in the second phase in the region of the measuring cross section;
density of the material in its first phase in the region of the measuring cross section;
density of the material in its second phase in the region of the measuring cross section; and/or
density of additional materials contained in the medium in their respective phases in the region of the measuring cross section.

11. The method as claimed in claim 1, wherein:
earlier ascertained dependencies of the density of the medium in the region of the measuring cross section on the specific total enthalpy of the medium in the region of the measuring cross section, the flow velocity of the medium in the region of the measuring cross section, the static pressure of the medium in the region of the measuring cross section and the static temperature of the medium in the region of the measuring cross section are electronically stored and, in the case of the step of determining density of the medium in the region of the measuring cross section, the density is determined based on the values actually present in the region of the measuring cross section for the specific, total enthalpy of the medium in the region of the measuring cross section, the flow velocity of the medium in the region of the measuring cross section, the static pressure of the medium in the region of the measuring cross section and the static temperature of the medium in the region of the measuring cross section.

12. The method as claimed in claim 11, wherein:
the dependencies of the density of the medium in the region of the measuring cross section on the specific total enthalpy of the medium in the region of the measuring cross section, the flow velocity of the medium in the region of the measuring cross section, the static pressure of the medium in the region of the measuring cross section and the static temperature of the medium in the region of the measuring cross section are stored in the form of a multidimensional table.

13. A vortex, flow measuring device for determining mass flow of an, at least at times, at least two-phase medium, which, in use, flows through a measuring tube, comprising:
at least one bluff body arranged within the measuring tube for producing vortices;
at least one vortex sensor for registering the produced vortices, and
electronics for determining flow velocity of the medium in the region of the measuring cross section, wherein:
said electronics of the vortex, flow measuring device is embodied in such a manner that it can determine density of the flowing medium in the region of the measuring cross section from the specific total enthalpy of the medium in the region of the measuring cross section, from the flow velocity of the medium in the region of the measuring cross section, from a static pressure of the medium in the region of the measuring cross section and from a static temperature of the medium in the region of the measuring cross section and that from the determined flow velocity, the determined density and a flow cross section of the medium in the region of the measuring cross section, it can determine the mass flow of the medium.

14. The vortex, flow measuring device according to claim 13, further comprising:
a pressure sensor in the region of the measuring cross section for determining the static pressure of the medium in the region of the measuring cross section and/or a temperature sensor for determining the static temperature of the medium in the region of the measuring cross section.

* * * * *